United States Patent
Kang et al.

(10) Patent No.: US 9,485,836 B2
(45) Date of Patent: Nov. 1, 2016

(54) CONTROLLING APPARATUS FOR DIMMING LEVEL OF LIGHT AND CONTROLLING METHOD OF THE SAME

(71) Applicant: Electronics and Telecommunications Research Institute, Daejeon (KR)

(72) Inventors: Hyun Chul Kang, Daejeon (KR); Jung Sik Sung, Daejeon (KR); Tae Gyu Kang, Daejeon (KR); Hyun Joo Kang, Daejeon (KR); Seong Hee Park, Daejeon (KR); Jong Woo Choi, Daejeon (KR)

(73) Assignee: ELECTRONICS AND TELECOMMUNICATIONS RESEARCH INSTIT, Daejeon (KR)

( * ) Notice: Subject to any disclaimer, the term of this patent is extended or adjusted under 35 U.S.C. 154(b) by 0 days.

(21) Appl. No.: 15/074,284

(22) Filed: Mar. 18, 2016

(65) Prior Publication Data

US 2016/0278182 A1    Sep. 22, 2016

(30) Foreign Application Priority Data

Mar. 19, 2015    (KR) .................... 10-2015-0038402

(51) Int. Cl.
H05B 37/02    (2006.01)
(52) U.S. Cl.
CPC ................. *H05B 37/0218* (2013.01)
(58) Field of Classification Search
CPC ....................................... H05B 37/02
USPC ............................... 315/149, 308
See application file for complete search history.

(56) References Cited

U.S. PATENT DOCUMENTS

| | | | | |
|---|---|---|---|---|
| 8,415,897 B2* | 4/2013 | Choong | ................. | H05B 37/02 315/294 |
| 8,779,667 B2* | 7/2014 | Nanahara | ........... | H05B 37/0227 315/151 |
| 9,072,130 B2* | 6/2015 | Ono | ................... | H05B 37/0227 |
| 2012/0176041 A1* | 7/2012 | Birru | ................. | H05B 37/0218 315/151 |
| 2014/0292209 A1 | 10/2014 | Kang et al. | | |
| 2014/0306609 A1 | 10/2014 | Kang et al. | | |
| 2015/0226406 A1* | 8/2015 | Lashina | ................ | G05D 25/02 362/235 |

FOREIGN PATENT DOCUMENTS

KR    101066238 B1    9/2011

* cited by examiner

*Primary Examiner* — Thuy Vinh Tran
(74) *Attorney, Agent, or Firm* — William Park & Associates LTD.

(57) ABSTRACT

Disclosed is a controlling apparatus for a dimming level of a light disposed on a ceiling surface, including: a sampling unit sampling an illumination value of a ceiling area depending on a change in a dimming level of the light; a communication unit receiving an illumination value of a floor area at a minimum dimming level of the light and an illumination value of the floor area at a maximum dimming level of the light; an estimation unit estimating an illumination value of the floor area at a current dimming level of the light based on an algorithm defined by using the illumination value of the floor area and the illumination value of the ceiling area at the minimum dimming level of the light, the illumination value of the floor area and the illumination value of the ceiling area at the maximum dimming level of the light, and the illumination value of the ceiling area at the current dimming level of the light; and a control unit controlling the dimming level of the light so that the estimated illumination value of the floor area and a target illumination value coincide with each other.

14 Claims, 6 Drawing Sheets

FIG.3

| DIMMING LEVEL | ILLUMINATION VALUE OF CEILING AREA [lux] |
|---|---|
| 1 | 10 |
| 2 | 30 |
| 3 | 50 |
| 4 | 70 |
| | ⋮ |

CONTROLLING APPARATUS FOR DIMMING LEVEL OF LIGHT AND CONTROLLING METHOD OF THE SAME

CROSS-REFERENCE TO RELATED APPLICATIONS

This application claims priority to and the benefit of Korean Patent Application No. 10-2015-0038402 filed in the Korean Intellectual Property Office on Mar. 19, 2015, the entire contents of which are incorporated herein by reference.

TECHNICAL FIELD

The present invention relates to a controlling apparatus for a dimming level of a light and a controlling method of the same.

BACKGROUND ART

In general, an indoor light of a construction is implemented by representatively installing a fluorescent lamp or a halogen lamp on a ceiling or a wall. The fluorescent lamp or the halogen lamp is universally utilized as an indoor lamp, while the fluorescent lamp or the halogen lamp has high power consumption and primarily provides only a unicolor light. In order to solve the high power consumption and monotony of the light, an LED light which shows lights having various colors at lower power consumption than the fluorescent lamp or the halogen lamp has been manufactured and released in recent years.

Meanwhile, with an increase in supply of the LED light, a research into light control using various sensors has been made in order to save energy. For example, an illumination sensor is installed while being separately separated from the light or installed on a ceiling surface while being integrated with the light to measure an illumination value and a light control device controls a dimming level of the light in a space by using the illumination value measured through the illumination sensor.

However, if illumination data on a floor is not collected through an illuminometer on the floor surface on which the light is installed or the illumination sensor on the floor, the illumination measurement value may significantly vary depending on an installation position (a ceiling where the light is installed and outside a light fixture) of the illumination sensor and a surrounding environment, and as a result, it is difficult to predict the accurate illumination value of the floor at a place where the light is installed.

SUMMARY OF THE INVENTION

The present invention has been made in an effort to provide a controlling apparatus for a dimming level of a light and a controlling method of the same which can accurately estimate an illumination value of a floor surface and control the dimming level of the light so as to make the estimated illumination value of the floor and a target illumination value coincide with each other.

The technical objects of the present invention are not limited to the aforementioned technical objects, and other technical objects, which are not mentioned above, will be apparently appreciated to a person having ordinary skill in the art from the following description.

An exemplary embodiment of the present invention provides a controlling apparatus for a dimming level of a light disposed on a ceiling surface, including: a sampling unit sampling an illumination value of a ceiling area depending on a change in the dimming level of the light; a communication unit receiving an illumination value of a floor area at a minimum dimming level of the light and an illumination value of the floor area at a maximum dimming level of the light; an estimation unit estimating an illumination value of the floor area at a current dimming level of the light based on an algorithm defined by using the illumination value of the floor area and the illumination value of the ceiling area at the minimum dimming level of the light, the illumination value of the floor area and the illumination value of the ceiling area at the maximum dimming level of the light, and the illumination value of the ceiling area at the current dimming level of the light; and a control unit controlling the dimming level of the light so that the estimated illumination value of the floor area and a target illumination value coincide with each other.

The sampling unit may sample the illumination value of the ceiling area measured through an illumination sensor depending on the change in the dimming level of the light.

The sampling unit may sample the illumination value of the ceiling area depending on the change in the dimming level of the light within a predetermined dimming level range.

The communication unit may acquire, from an illuminometer disposed on a floor surface, the illumination value of the floor area at the minimum dimming level of the light and the illumination value of the floor area at the maximum dimming level of the light.

The algorithm may be shown in [Equation 1] given below.

$$Y = ax + b \qquad \text{[Equation 1]}$$

Where $a=(y1-y2)/(s1-s2)$, $b=((y2-y1)*s2/(s1-s2))+y2$, y represents the estimated illumination value of the floor area, x represents the illumination value of the ceiling area at the current dimming level of the light, y1 represents the illumination value of the floor area at the minimum dimming level of the light, y2 represents the illumination value of the floor area at the maximum dimming level of the light, s1 represents the illumination value of the ceiling area at the minimum dimming level of the light, and s2 represents the illumination value of the ceiling area at the maximum dimming level of the light.

The control unit may calculate a predicted illumination value x of the ceiling area when the estimated illumination value of the floor area and the target illumination value are the same as each other by using the algorithm and decide a dimming level corresponding to the predicted illumination value by using the predicted illumination value and the illumination value of the ceiling area sampled depending on the change in the dimming level of the light.

The controlling apparatus may further include a light data management unit generating and managing light data including at least any one of the illumination value of the ceiling area depending on the change in the dimming level of the light, the illumination value of the floor area at the minimum dimming level of the light, the illumination value of the floor area at the maximum dimming level of the light, a light identifier, an illumination measurement time, and an illumination measurement period.

The controlling apparatus may further include a monitoring unit periodically monitoring whether the dimming level of is controlled so that the estimated illumination value of the floor area coincides with the target illumination value.

Another exemplary embodiment of the present invention provides a controlling method for a dimming level of a light disposed on a ceiling surface, including: sampling an illumination value of a ceiling area depending on a change in the dimming level of the light; acquiring an illumination value of a floor area at a minimum dimming level of the light and an illumination value of the floor area at a maximum dimming level of the light; estimating an illumination value of the floor area at a current dimming level of the light based on an algorithm defined by using the illumination value of the floor area and the illumination value of the ceiling area at the minimum dimming level of the light, the illumination value of the floor area and the illumination value of the ceiling area at the maximum dimming level of the light, and the illumination value of the ceiling area at the current dimming level of the light; and controlling the dimming level of the light so that the estimated illumination value of the floor area and a target illumination value coincide with each other.

In the sampling of the illumination value of the ceiling area depending on the change in the dimming level of the light, the illumination value of the ceiling area measured by using an illumination sensor depending on the change in the dimming level of the light may be sampled.

In the sampling of the illumination value of the ceiling area depending on the change in the dimming level of the light by using the illumination sensor, the illumination value of the ceiling area depending on the change in the dimming level of the light may be sampled within a predetermined dimming level range.

In the acquiring of the illumination value of the floor area at the minimum dimming level of the light and the illumination value of the floor area at the maximum dimming level of the light, the illumination value of the floor area at the minimum dimming level of the light and the illumination value of the floor area at the maximum dimming level of the light may be acquired by using an illuminometer.

The algorithm may be shown in [Equation 1] given below, which is defined by using the illumination value of the floor area and the illumination value of the ceiling area at the minimum dimming level of the light, the illumination value of the floor area and the illumination value of the ceiling area at the maximum dimming level of the light, and the illumination value of the ceiling area at the current dimming level of the light.

$$Y = ax + b \quad \text{[Equation 1]}$$

Where $a=(y1-y2)/(s1-s2)$, $b=((y2-y1)*s2/(s1-s2))+y2$, y represents the estimated illumination value of the floor area, x represents the illumination value of the ceiling area at the current dimming level of the light, y1 represents the illumination value of the floor area at the minimum dimming level of the light, y2 represents the illumination value of the floor area at the maximum dimming level of the light, s1 represents the illumination value of the ceiling area at the minimum dimming level of the light, and s2 represents the illumination value of the ceiling area at the maximum dimming level of the light.

In the controlling of the dimming level of the light so that the estimated illumination value of the floor area and a target illumination value coincide with each other, by using the algorithm, a predicted illumination value x of the ceiling area when the estimated illumination value of the floor area and the target illumination value are the same as each other may be calculated and a dimming level corresponding to the predicted illumination value may be decided by using the predicted illumination value and the illumination value of the ceiling area sampled depending on the change in the dimming level of the light.

According to exemplary embodiments of the present invention, a controlling apparatus for a dimming level of a light and a controlling method of the same can accurately estimate an illumination value of a floor and control the dimming level of the light so as to make the estimated illumination value of the floor surface and a target illumination value coincide with each other.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

BRIEF DESCRIPTION OF THE DRAWINGS

FIG. 3 illustrates a sampling result of an illumination value in a ceiling area depending on a change in dimming level of a light according to an exemplary embodiment of the present invention.

Figure 1:
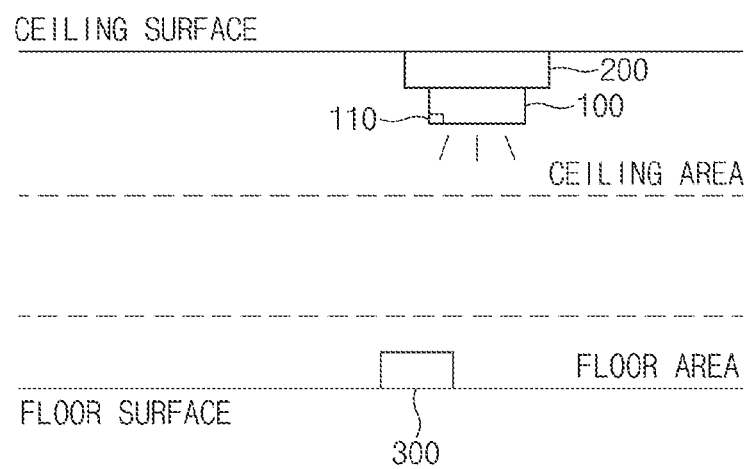
FIG. 1 schematically illustrates a controlling apparatus for a dimming level of a light according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, some exemplary embodiments of the present invention will be described in detail with reference to the exemplary drawings. When reference numerals refer to components of each drawing, it should be noted that although the same components are illustrated in different drawings, the same components are designated by the same reference numerals as possible. In describing the exemplary embodiments of the present invention, when it is determined that the detailed description of the known components and functions related to the present invention may obscure understanding of the exemplary embodiments of the present invention, the detailed description thereof will be omitted.

Terms such as first, second, A, B, (a), (b), and the like may be used in describing the components of the exemplary embodiments of the present invention. The terms are only used to distinguish a component from another component, but nature or an order of the component is not limited by the terms. Further, if it is not contrarily defined, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as ideal or excessively formal meanings unless clearly defined in the present application.

FIG. 1 schematically illustrates a controlling apparatus for a dimming level of a light according to an exemplary embodiment of the present invention.

Referring to FIG. 1, the controlling apparatus 200 for a dimming level of a light according to the exemplary embodiment of the present invention may control the dimming level of the light 100.

The controlling apparatus 200 for the dimming level of the light may control the dimming level of the light 100 so as to make an illumination value of a floor area coincide with a target illumination value based on the floor area by using an illumination value in a ceiling area of the light, an illumination value of the floor area, and the like. The controlling apparatus 200 for the dimming level of the light may acquire the illumination value of the ceiling area by using an illumination sensor 110. The controlling apparatus 200 for the dimming level of the light may acquire the illumination value of the floor area from an illuminometer 300.

For example, the ceiling area may be defined as an area separated from a ceiling surface by a predetermined distance and the floor area may be defined as an area separated from a floor surface to which light from the light 100 is irradiated by a predetermined distance. Further, the floor area may mean an area where an illumination value closest to an illumination value felt by a user positioned in a space in which the light 100 is installed may be measured.

The controlling apparatus 200 for the dimming level of the light may be coupled with the light 100 or disposed to be adjacent to the light 100.

The light 100 may be disposed on the ceiling surface and the controlling apparatus 200 for the dimming level of the light may be disposed on both sides of the light 100 or between the light 100 and the ceiling surface. The illumination sensor 110 may be coupled with the light 100 or disposed to be adjacent to the light 100. The illumination sensor 110 may have at least three operating modes. For example, the illumination sensor 110 may have a deactivation mode, a passive activation mode, and an automatic activation mode. When the illumination sensor 110 is in the passive activation mode, illumination values of the ceiling area are measured, but a controlling operation for the dimming level of the light by the dimming level controlling apparatus 200 may not be performed. When the illumination sensor 110 is in the automatic activation mode, the illumination values of the ceiling area are measured, but the controlling operation for the dimming level of the light by the dimming level controlling apparatus 200 may be performed.

The illuminometer 300 may be disposed on the floor surface. The illuminometer 300 may measure a relatively objective illumination value of the floor area. The illuminometer 300 may transfer the measured illumination value of the floor area to the light dimming level controlling apparatus 200 and/or a user terminal (not illustrated).

As described above, the controlling apparatus 200 for the dimming level of the light according to the exemplary embodiment of the present invention controls the dimming level of the light 100 so as to make the illumination value of the floor area and the target illumination value coincide with each other to change illumination of the floor area felt by the user to the target illumination value desired by the user.

Hereinafter, a configuration and an operation of the controlling apparatus 200 for the dimming level of the light will be described in more detail with reference to FIGS. 2 to 4.

Figure 2:
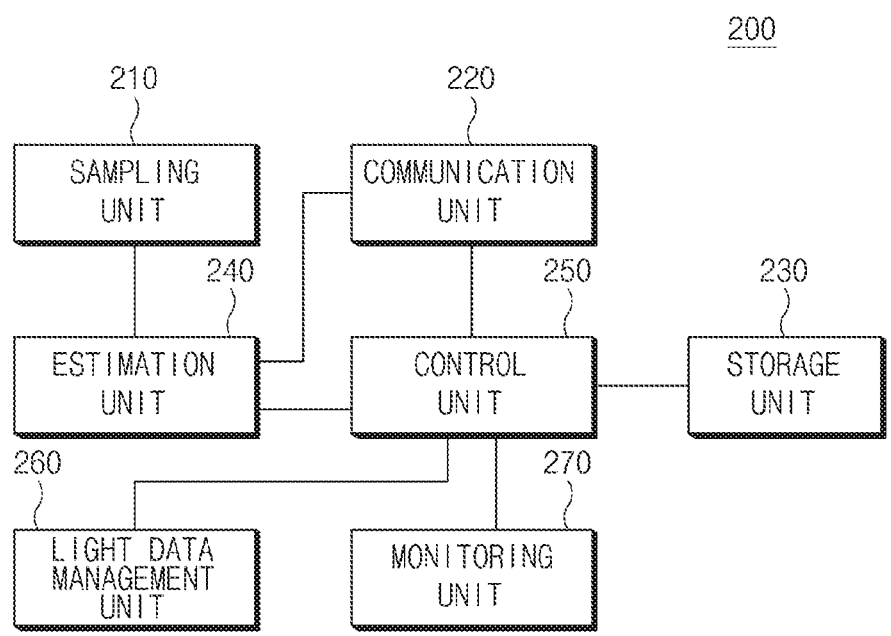
FIG. 2 is a block diagram illustrating a controlling apparatus for a dimming level of a light according to an exemplary embodiment of the present invention.

FIG. 2 is a block diagram illustrating a controlling apparatus for a dimming level of a light according to an exemplary embodiment of the present invention. FIG. 3 illustrates a sampling result of an illumination value in a ceiling area depending on a change in the dimming level of a light according to an exemplary embodiment of the present invention.

First, referring to FIG. 2, the controlling apparatus 200 for the dimming level of the light according to the exemplary embodiment of the present invention may include a sampling unit 210, a communication unit 220, a storage unit 230, an estimation unit 240, a control unit 250, a light data management unit 260, and a monitoring unit 270.

The sampling unit 210 may sample the illumination value of the ceiling area depending on a change in the dimming level of the light 100 (see FIG. 1). The sampling unit 210 may sample the illumination value by using the illumination values of the ceiling area received through the communication unit 220. The sampling unit 210 may determine whether pre-sampled data exists before performing a sampling operation and when the pre-sampled data does not exist, the sampling unit 210 may perform the sampling operation. For example, the sampling unit 210 may determine whether the pre-sampled data exists through a sampling flag.

Referring to FIG. 3, the sampling unit 210 may sample the illumination value of the ceiling area depending for each dimming level of the light 100 in a table form. For example, the dimming level of the light 100 may be decided in the range of 1 to 255 according to setting. The illumination value may be sampled by the unit of lux. An illumination value of the ceiling area at a minimum dimming level of the light 100 and/or an illumination value of the ceiling area at a maximum dimming level of the light 100 may be acquired through a sampling process of the sampling unit 210.

Referring back to FIG. 2, the communication unit 220 may communicate with the illumination sensor 110 (see FIG. 1), the illuminometer 300 (see FIG. 1), and/or the user terminal (not illustrated).

The communication unit 220 may receive from the illumination sensor 110 the illumination value of the ceiling area depending on the change in the dimming level of the light 100. The communication unit 220 may receive from the illuminometer 300 the illumination value of the floor area at the minimum dimming level of the light 100 and/or the illumination value of the floor area at the maximum dimming level of the light 100. Further, the communication unit 220 may transmit the light data generated from the light data management unit 260 to the user terminal. The communication unit 220 may include various wired or wireless communication interfaces.

The storage unit 230 may store the table generated by the sampling unit 210 and/or the illumination value of the floor area at the minimum dimming level of the light 100 and/or the illumination value of the floor area at the maximum dimming level of the light 100 received by the communication unit 220.

For example, the storage unit 230 may include at least any one type storage medium of memories including a flash memory type, a hard disk type, a micro type, a card type (for example, secure digital (SD) card or extreme digital (XD)

card and memories including a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type memory.

The estimation unit 240 may estimate the illumination value of the floor area at a current dimming level of the light 100 based on an algorithm defined by using the illumination value of the floor area and the illumination value of the ceiling area at the minimum dimming level of the light 100, the illumination value of the floor area and the illumination value of the ceiling area at the maximum dimming level of the light 100, and the illumination value of the ceiling area at the current dimming level of the light 100.

The estimation unit 240 may receive the illumination value of the ceiling area at the minimum dimming level of the light 100 and the illumination value of the ceiling area at the maximum dimming level of the light 100 from the sampling unit 210 or the storage unit 230. The estimation unit 240 may receive the illumination value of the ceiling area at the current dimming level of the light 100 from the communication unit 220. The estimation unit 240 may receive the illumination value of the floor area at the minimum dimming level of the light 100 and the illumination value of the floor area at the maximum dimming level of the light 100 from the communication unit 220.

The algorithm used for the estimation unit 240 to estimate the illumination value of the floor area at the current dimming level of the light 100 may be defined as shown in [Equation 1] given below.

$$Y=ax+b \quad \text{[Equation 1]}$$

(Where a=(y1−y2)/(s1−s2), b=((y2−y1)*s2/(s1−s2))+y2, Y represents the estimated illumination value of the floor area, x represents the illumination value of the ceiling area at the current dimming level of the light, y1 represents the illumination value of the floor area at the minimum dimming level of the light, y2 represents the illumination value of the floor area at the maximum dimming level of the light, s1 represents the illumination value of the ceiling area at the minimum dimming level of the light, and s2 represents the illumination value of the ceiling area at the maximum dimming level of the light).

Through such an algorithm, the estimation unit 240 may accurately estimate the illumination value of the floor area.

The control unit 250 may control the dimming level of the light 100 so that the illumination value of the floor area estimated at the current dimming level of the light 100 coincides with the target illumination value. For example, the control unit 250 may calculate a predicted illumination value x of the ceiling area when the illumination value of the floor area estimated at the current dimming level of the light 100 and the target illumination value are the same as each other and decide a dimming level corresponding to the predicted illumination value by using the predicted illumination value and the illumination value of the ceiling area sampled depending on the change in the dimming level of the light.

When this is described in terms of development of the equation, it may be appreciated that the target illumination value is substituted in y to calculate x (that is, the predicted illumination value of the ceiling area) in [Equation 1] given above. In addition, the control unit 250 decides a dimming level corresponding to x by using a table generated by the sampling unit 210 to control the dimming level of the light 100 so that the illumination value of the floor area estimated at the current dimming level of the light 100 coincides with the target illumination value.

Meanwhile, when there is no dimming level value corresponding to x in the table generated by the sampling unit 210, the control unit 250 may select a dimming level value corresponding to an illumination value closest to the calculated predicted illumination value x of the ceiling area. Further, when there is no dimming level value corresponding to x in the table generated by the sampling unit 210, the control unit 250 may decide a dimming level within a predetermined error range.

The light data management unit 260 may generate and manage light data including at least any one of the illumination value of the ceiling area depending on the change in the dimming level of the light 100, the illumination value of the floor area at the minimum dimming level of the light 100, the illumination value of the floor area at the maximum dimming level of the light 100, a light identifier, an illumination measurement time, and an illumination measurement period. The generated light data may be transferred to the user terminal through the communication unit 220.

The monitoring unit 270 may periodically monitor whether the dimming level of the light 100 is controlled so that the estimated illumination value of the floor area coincides with the target illumination value. The monitoring unit 270 may transfer a monitoring result to the control unit 250 when the dimming level of the light 100 is not controlled so that the estimated illumination value of the floor area coincides with the target illumination value.

As described above, the controlling apparatus 200 for the dimming level of the light according to the exemplary embodiment of the present invention controls the dimming level of the light 100 so as to make the illumination value of the floor area and the target illumination value coincide with each other to automatically change the illumination of the floor area felt by the user to the target illumination value desired by the user.

Figure 4:
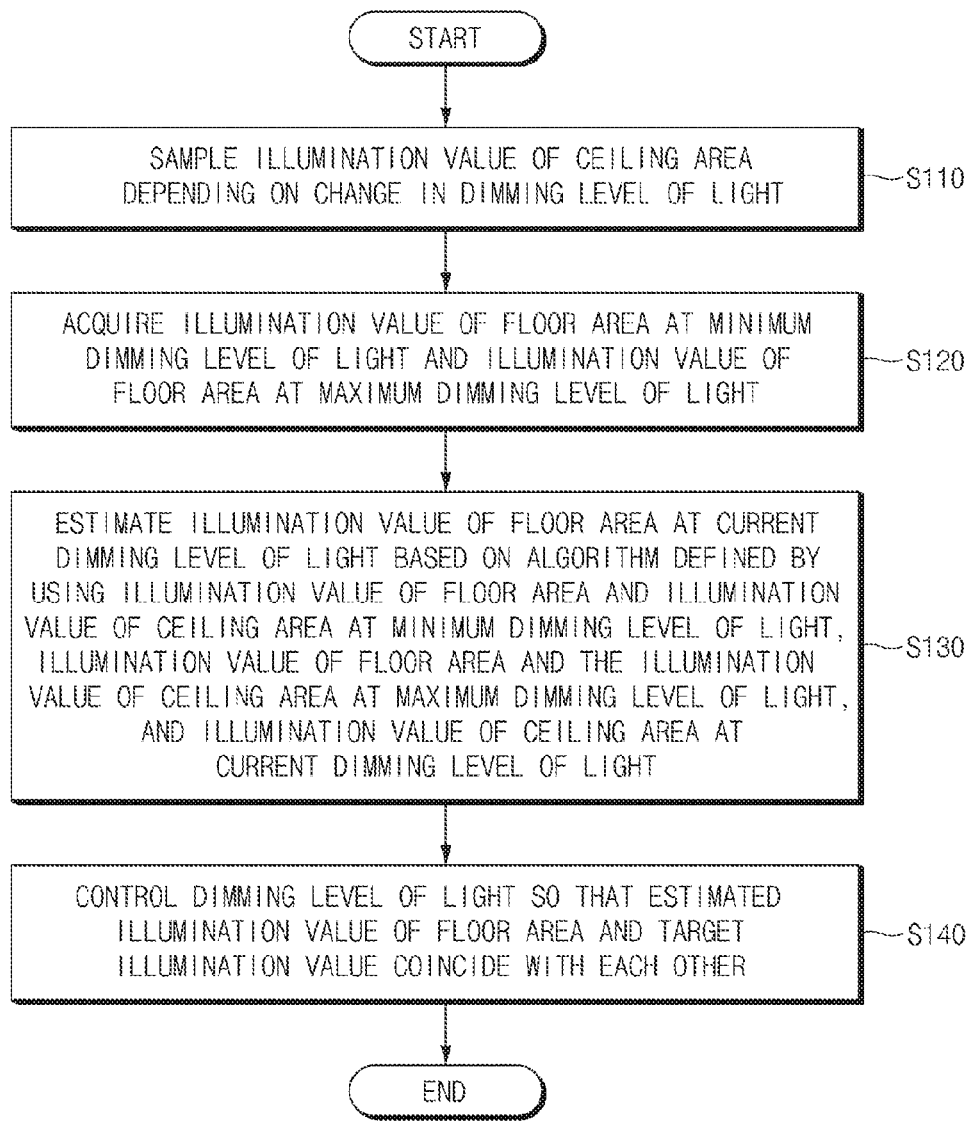
FIG. 4 is a flowchart illustrating a controlling method for a dimming level of a light according to an exemplary embodiment of the present invention.

FIG. 4 is a flowchart illustrating a controlling method for a dimming level of a light according to an exemplary embodiment of the present invention.

Referring to FIG. 4, the controlling method for a dimming level of a light according to the exemplary embodiment of the present invention may include sampling an illumination value of a ceiling area depending on a change in the dimming level of the light (S110), acquiring an illumination value of a floor area at a minimum dimming level of the light and an illumination value of the floor area at a maximum dimming level of the light (S120), estimating an illumination value of the floor area at a current dimming level of the light based on an algorithm defined by using the illumination value of the floor area and an illumination value of a ceiling area at the minimum dimming level of the light, the illumination value of the floor area and the illumination value of the ceiling area at the maximum dimming level of the light, and an illumination value of the ceiling level at the current dimming level of the light (S130), and controlling the dimming level of the light so that the estimated illumination value of the floor area and a target illumination value coincide with each other (S140).

Hereinafter, steps S110 to S140 described above will be described in more detail with reference to FIGS. 1 to 3.

A sampling unit 210 (see FIG. 2) may sample an illumination value of a ceiling area depending on a change in the dimming level of a light 100 (see FIG. 1) (S110). The sampling unit 210 may sample the illumination value by using the illumination values of the ceiling area received through a communication unit 220. The sampling unit 210 may sample the illumination value of the ceiling area for each dimming level of the light 100 in a table form (see FIG. 3). Step S110 may be performed simultaneously with or earlier than step S120.

The communication unit 220 may receive from an illuminometer 300 the illumination value of the floor area at the minimum dimming level of the light 100 and/or the illumination value of the floor area at the maximum dimming level of the light 100 (S120).

The estimation unit 240 may estimate the illumination value of the floor area at the current dimming level of the light 100 based on the algorithm defined by using the illumination value of the floor area and the illumination value of the ceiling area at the minimum dimming level of the light 100, the illumination value of the floor area and the illumination value of the ceiling area at the maximum dimming level of the light 100, and the illumination value of the ceiling area at the current dimming level of the light 100 (S130).

The algorithm used for the estimation unit 240 to estimate the illumination value of the floor area at the current dimming level of the light 100 may be defined as shown in [Equation 1] given below.

$$Y = ax + b \quad \text{[Equation 1]}$$

(Where $a=(y1-y2)/(s1-s2)$, $b=((y2-y1)*s2/(s1-s2))+y2$, y represents the estimated illumination value of the floor area, x represents the illumination value of the ceiling area at the current dimming level of the light, y1 represents the illumination value of the floor area at the minimum dimming level of the light, y2 represents the illumination value of the floor area at the maximum dimming level of the light, s1 represents the illumination value of the ceiling area at the minimum dimming level of the light, and s2 represents the illumination value of the ceiling area at the maximum dimming level of the light).

The control unit 250 may control a dimming level of the light 100 so that the illumination value of the floor area estimated at the current dimming level of the light 100 coincides with a target illumination value (S140). For example, the control unit 250 may calculate a predicted illumination value x of the ceiling area when the illumination value of the floor area estimated at the current dimming level of the light 100 and the target illumination value are the same as each other and decide a dimming level corresponding to the predicted illumination value by using the predicted illumination value and the illumination value of the ceiling area sampled depending on the change in the dimming level of the light.

Figure 5:
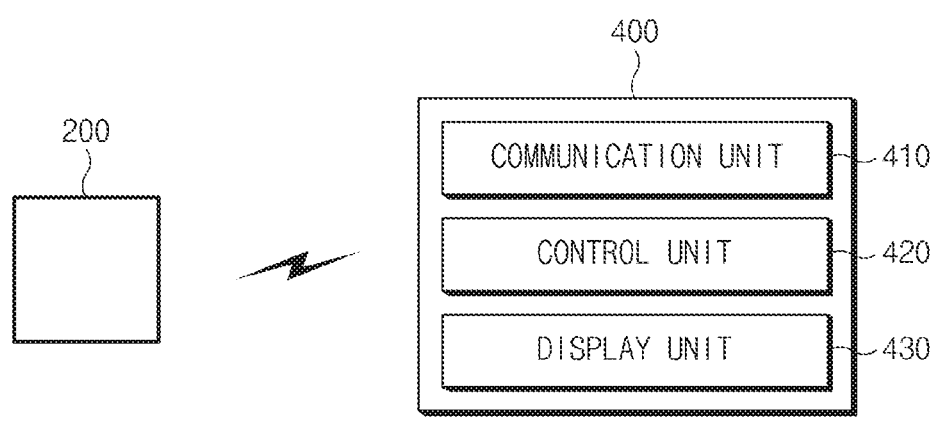
FIG. 5 illustrates communication of a controlling apparatus for a dimming level of a light and a user terminal according to an exemplary embodiment of the present invention.

FIG. 5 illustrates communication of a controlling apparatus for a dimming level of a light and a user terminal according to an exemplary embodiment of the present invention.

Referring to FIG. 5, the controlling apparatus 200 for a dimming level of a light according to the exemplary embodiment of the present invention may communicate with the user terminal 400. For example, the controlling apparatus 200 for the dimming level of the light may transmit light data to the user terminal 400.

Various exemplary embodiments of the user terminal 400 may include a cellular phone, a smart phone having a wireless communication function, a personal digital assistant (PDA) having the wireless communication function, a wireless modem, a portable computer having the wireless communication function, a photographing device such as a digital camera having the wireless communication function, a gaming device having the wireless communication function, music storing and playing home appliances having the wireless communication function, Internet home appliances in which wireless Internet access and browsing are available and portable units or terminals having integrated combinations of the functions, but are not limited thereto. The user terminal 400 may include a communication unit 410, a control unit 420, and a display unit 430.

The communication unit 410 may receive the light data from the controlling apparatus 200 for the dimming level of the light. The communication unit 410 may transmit a new target illumination value depending on user setting, and the like to the controlling apparatus 200 for the dimming level of the light.

The control unit 420 processes the light data transferred from the controlling apparatus 200 for the dimming level of the light to output the processed light data to the display unit 430.

The display unit 430 may output the light data. Therefore, a user may verify a current illumination value of the ceiling area, a current illumination value of the floor area, and the like through the user terminal 400.

Figure 6:
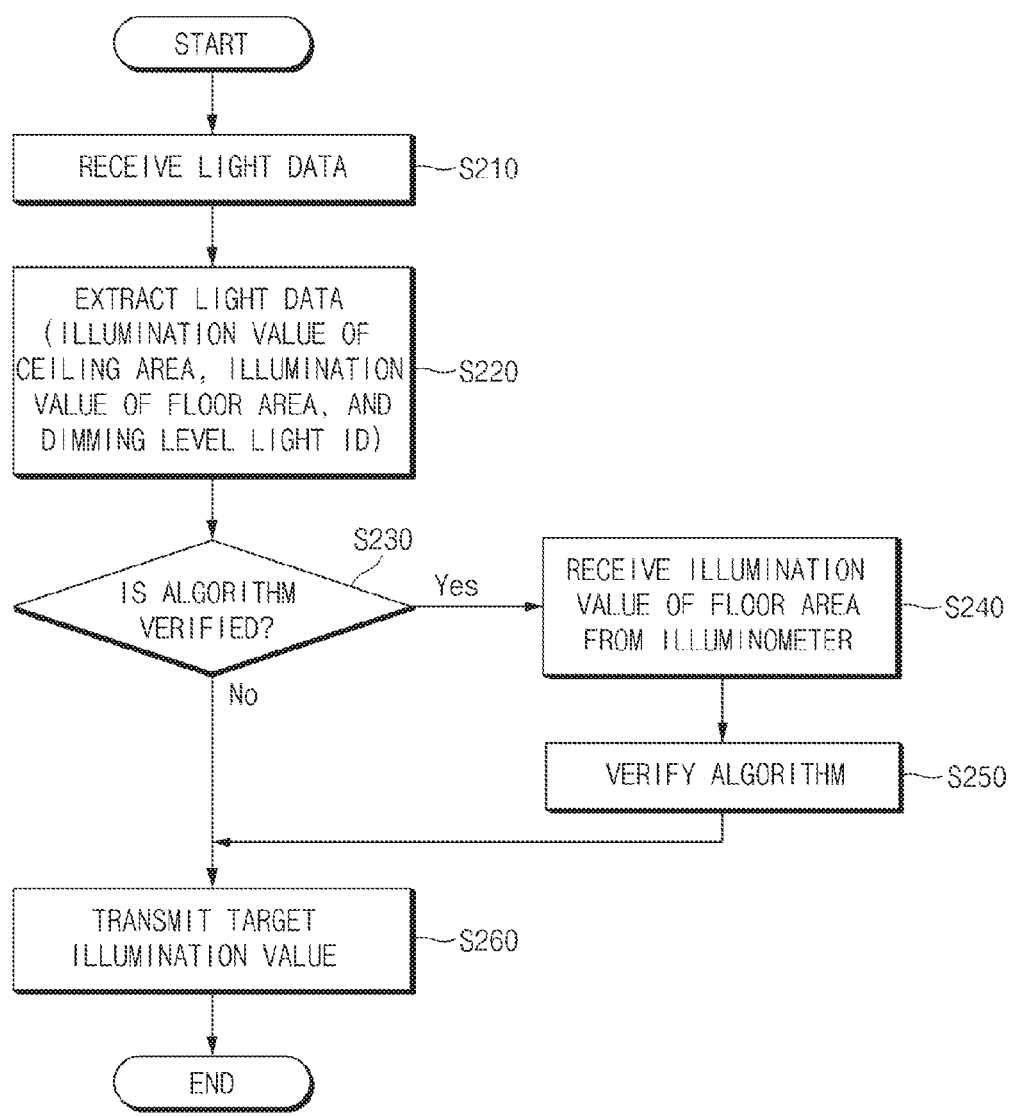
FIG. 6 is a flowchart illustrating an operating method of a user terminal according to an exemplary embodiment of the present invention.

FIG. 6 is a flowchart illustrating an operating method of a user terminal according to an exemplary embodiment of the present invention.

Referring to FIG. 6, the operating method of the user terminal according to the exemplary embodiment of the present invention may include receiving light data (S210), extracting the light data (S220), selecting whether an algorithm is verified (S230), receiving an illumination value of a floor area from an illuminometer when the algorithm is verified (S240), and verifying the algorithm (S250).

Hereinafter, steps S210 to S260 described above will be described in detail with reference to FIG. 5.

A communication unit 410 may receive light data from a controlling apparatus 200 for the dimming level of a light. The light data may include, for example, an illumination value of a ceiling area, an illumination value of a floor area, a dimming level of the light, a light identifier, and the like.

A control unit 420 may extract the light data (S220).

The control unit 420 may select whether the algorithm is verified by a user (S230).

The control unit 420 may receive an illumination value of a floor area from an illuminometer 300 (see FIG. 1) through the communication unit 410 when the verification of the algorithm is selected (S240).

The control unit 420 may verify the algorithm by using the received illumination value of the floor area. For example, the control unit 420 may verify the algorithm by substituting the illumination value of the floor area received in [Equation 1] given above.

Further, the control unit 420 may transmit a new target illumination value to the controlling apparatus 200 for the dimming level of the light through the communication unit 410 when the target illumination value is reset by the use.

Accordingly, the user may verify the light data through the user terminal 400 in real time and may control the light at a dimming level corresponding to the new target illumination value.

The above description just illustrates the technical spirit of the present invention and various modifications and transformations can be made by those skilled in the art without departing from an essential characteristic of the present invention.

Therefore, the exemplary embodiments disclosed in the present invention are used to not limit but describe the technical spirit of the present invention and the scope of the technical spirit of the present invention is not limited by the exemplary embodiments. The scope of the present invention should be interpreted by the appended claims and it should be analyzed that all technical spirit in the equivalent range is intended to be embraced by the present invention.

What is claimed is:

1. A controlling apparatus for a dimming level of a light disposed on a ceiling surface, the controlling apparatus comprising:
   a sampling unit sampling an illumination value of a ceiling area depending on a change in the dimming level of the light;
   a communication unit receiving an illumination value of a floor area at a minimum dimming level of the light and an illumination value of the floor area at a maximum dimming level of the light;
   an estimation unit estimating an illumination value of the floor area at a current dimming level of the light based on an algorithm defined by using the illumination value of the floor area and the illumination value of the ceiling area at the minimum dimming level of the light, the illumination value of the floor area and the illumination value of the ceiling area at the maximum dimming level of the light, and the illumination value of the ceiling area at the current dimming level of the light; and
   a control unit controlling the dimming level of the light so that the estimated illumination value of the floor area and a target illumination value coincide with each other.

2. The controlling apparatus of claim 1, wherein the sampling unit samples the illumination value of the ceiling area measured through an illumination sensor depending on the change in dimming level of the light.

3. The controlling apparatus of claim 1, wherein the sampling unit samples the illumination value of the ceiling area depending on the change in the dimming level of the light within a predetermined dimming level range.

4. The controlling apparatus of claim 1, wherein the communication unit acquires, from an illuminometer disposed on a floor surface, the illumination value of the floor area at the minimum dimming level of the light and the illumination value of the floor area at the maximum dimming level of the light.

5. The controlling apparatus of claim 1, wherein the algorithm is shown as
   Where $a=(y1-y2)/(s1-s2)$, $b=((y2-y1)*s2/(s1-s2))+y2$, Y represents the estimated illumination value of the floor area, x represents the illumination value of the ceiling area at the current dimming level of the light, y1 represents the illumination value of the floor area at the minimum dimming level of the light, y2 represents the illumination value of the floor area at the maximum dimming level of the light, s1 represents the illumination value of the ceiling area at the minimum dimming level of the light, and s2 represents the illumination value of the ceiling area at the maximum dimming level of the light.

6. The controlling apparatus of claim 5, wherein the control unit calculates a predicted illumination value x of the ceiling area when the estimated illumination value of the floor and the target illumination value are the same as each other by using the algorithm and decides a dimming level corresponding to the predicted illumination value by using the predicted illumination value and the illumination value of the ceiling area sampled depending on the change in the dimming level of the light.

7. The controlling apparatus of claim 1, further comprising:
   a light data management unit generating and managing light data including at least any one of the illumination value of the ceiling area depending on the change in the dimming level of the light, the illumination value of the floor area at the minimum dimming level of the light, the illumination value of the floor area at the maximum dimming level of the light, a light identifier, an illumination measurement time, and an illumination measurement period.

8. The controlling apparatus of claim 1, further comprising:
   a monitoring unit periodically monitoring whether the dimming level of the light is controlled so that the estimated illumination value of the floor area coincides with the target illumination value.

9. A controlling method for a dimming level of a light disposed on a ceiling surface, the controlling method comprising:
   sampling an illumination value of a ceiling area depending on a change in the dimming level of the light;
   acquiring an illumination value of a floor area at a minimum dimming level of the light and an illumination value of the floor area at a maximum dimming level of the light;
   estimating an illumination value of the floor area at a current dimming level of the light based on an algorithm defined by using the illumination value of the floor area and the illumination value of the ceiling area at the minimum dimming level of the light, the illumination value of the floor area and the illumination value of the ceiling area at the maximum dimming level of the light, and the illumination value of the ceiling area at the current dimming level of the light; and
   controlling the dimming level of the light so that the estimated illumination value of the floor area and a target illumination value coincide with each other.

10. The controlling method of claim 9, wherein in the sampling of the illumination value of the ceiling area depending on the change in the dimming level of the light, the illumination value of the ceiling area measured by using an illumination sensor depending on the change in the dimming level of the light is sampled.

11. The controlling method of claim 9, wherein in the sampling of the illumination value of the ceiling area depending on the change in the dimming level of the light by using the illumination sensor, the illumination value of the ceiling area depending on the change in the dimming level of the light is sampled within a predetermined dimming level range.

12. The controlling method of claim 9, wherein in the acquiring of the illumination value of the floor area at the minimum dimming level of the light and the illumination value of the floor area at the maximum dimming level of the light, the illumination value of the floor area at the minimum dimming level of the light and the illumination value of the floor area at the maximum dimming level of the light are acquired by using an illuminometer.

13. The controlling method of claim 9, wherein an algorithm is shown below, which is defined by using the illumination value of the floor area and the illumination value of the ceiling area at the minimum dimming level of the light, the illumination value of the floor area and the illumination value of the ceiling area at the maximum dimming level of the light, and the illumination value of the ceiling area at the current dimming level of the light.

$$Y = ax + b \quad \text{[Equation 1]}$$

Where $a=(y1-y2)/(s1-s2)$, $b=((y2-y1)*s2/(s1-s2))+y2$, Y represents the estimated illumination value of the floor area, x represents the illumination value of the ceiling area at the current dimming level of the light, y1 represents the illumination value of the floor area at the minimum dimming level of the light, y2 represents the illumination value of the floor area at the maximum dimming level of the light, s1 represents the illumination value of the ceiling area at the minimum dimming level of the light, and s2 represents the illumination value of the ceiling area at the maximum dimming level of the light.

14. The controlling method of claim 13, wherein in the controlling of the dimming level of the light so that the estimated illumination value of the floor area and a target illumination value coincide with each other, by using the algorithm, a predicted illumination value x of the ceiling area when the estimated illumination value of the floor area and the target illumination value are the same as each other is calculated and a dimming level corresponding to the predicted illumination value is decided by using the predicted illumination value and the illumination value of the ceiling area sampled depending on the change in the dimming level of the light.

\* \* \* \* \*